United States Patent
Wang (10) Patent No.: US 9,965,979 B2
(45) Date of Patent: May 8, 2018

(54) DISPLAY SYSTEM AND ENCRYPTION AND DECRYPTION METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventor: Junwei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 127 days.

(21) Appl. No.: 15/098,493

(22) Filed: Apr. 14, 2016

(65) Prior Publication Data
US 2016/0337125 A1 Nov. 17, 2016

(30) Foreign Application Priority Data
May 11, 2015 (CN) .......................... 2015 1 0236858

(51) Int. Cl.
*G06F 21/00* (2013.01)
*G09C 5/00* (2006.01)
(52) U.S. Cl.
CPC ...................... *G09C 5/00* (2013.01)
(58) Field of Classification Search
CPC ..................................................... G09C 5/00
See application file for complete search history.

(56) References Cited

U.S. PATENT DOCUMENTS

| | | | |
|---|---|---|---|
| 6,806,930 B2 | 10/2004 | Moia | |
| 7,370,978 B2* | 5/2008 | Anderson | G03B 21/10 353/122 |
| 2002/0101988 A1* | 8/2002 | Jones | G09C 5/00 380/54 |
| 2006/0008086 A1 | 1/2006 | Kevenaar et al. | |
| 2006/0026428 A1 | 2/2006 | Schrijen et al. | |
| 2006/0115082 A1* | 6/2006 | Kevenaar | G07D 7/0053 380/216 |

(Continued)

FOREIGN PATENT DOCUMENTS

| | | |
|---|---|---|
| CN | 1397047 A | 2/2003 |
| CN | 1682477 A | 10/2005 |

(Continued)

OTHER PUBLICATIONS

Yamamoto et al., "Securing information display by use of visual cryptography", Optics Letters vol. 28, No. 17, pp. 1564-1566, Published Feb. 2003.*

(Continued)

*Primary Examiner* — Chau Le
(74) *Attorney, Agent, or Firm* — Nath, Goldberg & Meyer; Joshua B. Goldberg; Stanley N. Protigal (57) ABSTRACT

The present invention discloses a display system and an encryption and decryption method thereof. The display system includes a display apparatus and a decryption apparatus. The decryption apparatus includes a decryption device which includes a decryption panel. The display apparatus generates encrypted first display light. The decryption panel decrypts the first display light according to a preset cipher.

10 Claims, 7 Drawing Sheets generating, by the display apparatus, encrypted first display light — 901 decrypting, by the decryption panel, the first display light according to a preset cipher — 902

(56) References Cited

U.S. PATENT DOCUMENTS

| | | | |
|---|---|---|---|
| 2007/0057886 A1* | 3/2007 | Johnson | G09C 5/00 345/90 |
| 2007/0118482 A1* | 5/2007 | Tuyls | G06F 21/84 705/62 |
| 2008/0107263 A1* | 5/2008 | Bastanchury | H04N 7/167 380/201 |
| 2009/0268904 A1 | 10/2009 | Verhulst et al. | |
| 2011/0099591 A1* | 4/2011 | Long | H04N 7/1675 725/81 |
| 2011/0285699 A1* | 11/2011 | Bittner | H04N 13/04 345/419 |
| 2011/0286093 A1* | 11/2011 | Bittner | G02B 27/22 359/466 |
| 2013/0083922 A1* | 4/2013 | Kanda | H04N 21/4122 380/200 |
| 2015/0026456 A1* | 1/2015 | Kim | G06F 21/00 713/153 |
| 2017/0223412 A1* | 8/2017 | Song | H04N 21/44016 |

FOREIGN PATENT DOCUMENTS

| | | |
|---|---|---|
| CN | 1726507 A | 1/2006 |
| CN | 1864358 A | 11/2006 |
| CN | 101084638 A | 12/2007 |

OTHER PUBLICATIONS

Office Action dated May 31, 2017 issued in corresponding Chinese Application No. 201510236858.2.

* cited by examiner

DISPLAY SYSTEM AND ENCRYPTION AND DECRYPTION METHOD THEREOF

FIELD OF THE INVENTION

The present invention relates to the field of display technology, and particularly, relates to a display system and an encryption and decryption method thereof.

BACKGROUND OF THE INVENTION

With the development of information technology, information encryption has been widely used. Since the Liquid Crystal Display (LCD) is a major carrier for displaying image information, how to encrypt displayed images on the liquid crystal display is becoming more and more important. The conventional video signal encryption technology has a good security in signal transmission and signal preservation, but cannot achieve real-time viewing. In addition, an existing encryption technology realizes an encryption function by removing a polarizer of the liquid crystal display so that the liquid crystal display can only display a white bright field, but in practice, the displayed images could be viewed as long as the polarizer is available, and therefore this encryption technology has a poor security.

In another encryption technology, a good security is expected by adhering a phase delay film to the liquid crystal display to cause the displayed images on the liquid crystal display to be distorted, and in the meantime, adhering a depolarization film to the polarized glasses. However, the displayed images could be viewed only by wearing the same glasses. The displayed images could be acquired by trying films having different delay amounts to find an appropriate delay amount, and therefore this encryption technology also has a poor security.

SUMMARY OF THE INVENTION

To solve the problem of poor security of the display encryption technology in the related art, the present invention provides a display system and an encryption and decryption method thereof.

According to an aspect of the present invention, there is provided a display system including a display apparatus and a decryption apparatus. The decryption apparatus includes a decryption device, which includes a decryption panel. The display apparatus generates encrypted first display light. The decryption panel decrypts the first display light according to a preset cipher.

According to the embodiment of the present invention, the display apparatus may include a display device and an encryption device. The encryption device may include an encryption panel and a first driving controller. The decryption device may further include a second driving controller. The display device generates second display light, the first driving controller generates a first driving signal according to the cipher, and the encryption panel generates a plurality of encryption areas according to the first driving signal, and converts the incident second display light into the first display light having different polarizing states in different encryption areas. The second driving controller generates a second driving signal according to the cipher, and the decryption panel generates decryption areas corresponding to the encryption areas according to the second driving signal, and converts the incident first display light into the second display light in the decryption areas.

According to the embodiment of the present invention, the display system may further include a signal transmitter and a signal receiver. The signal transmitter transmits position signals of the encryption areas, and the signal receiver receives the position signals to determine correspondence between the decryption areas and the encryption areas.

According to the embodiment of the present invention, the encryption panel may include a first liquid crystal panel, and the decryption panel may include a second liquid crystal panel. Arrangement directions of liquid crystals in the first liquid crystal panel and the second liquid crystal panel are perpendicular to each other.

According to the embodiment of the present invention, the first driving controller may include a first converting unit, a first generating unit and a first shift register unit, and the first generating unit is connected to the first converting unit and the first shift register unit, respectively. The second driving controller may include a second converting unit, a second generating unit and a second shift register unit, and the second generating unit is connected to the second converting unit and the second shift register unit, respectively. The first converting unit converts the cipher into a first binary code, the first generating unit generates a first data signal and a first clock signal according to the first binary code, and the first shift register unit generates the first driving signal according to the first data signal and the first clock signal. The second converting unit converts the cipher into a second binary code, the second generating unit generates a second data signal and a second clock signal according to the second binary code, and the second shift register unit generates the second driving signal according to the second data signal and the second clock signal.

According to the embodiment of the present invention, the first driving controller may include a first storage unit and a first selecting unit, and the first storage unit is connected to the first selecting unit. The second driving controller may include a second storage unit and a second selecting unit, and the second storage unit is connected to the second selecting unit. The first storage unit stores the first driving signal correspondingly to the cipher, and the first selecting unit retrieves the first driving signal corresponding to the cipher, according to the cipher. The second storage unit stores the second driving signal correspondingly to the cipher, and the second selecting unit retrieves the second driving signal corresponding to the cipher, according to the cipher.

According to another aspect of the present invention, there is provided an encryption and decryption method of a display system. The display system includes a display apparatus and a decryption apparatus, and the decryption apparatus includes a decryption device, which includes a decryption panel. The encryption and decryption method includes steps of: generating, by the display apparatus, encrypted first display light; and decrypting, by the decryption panel, the first display light according to a preset cipher.

According to the embodiment of the present invention, the display apparatus may include a display device and an encryption device, the encryption device may include an encryption panel and a first driving controller, and the decryption device may further include a second driving controller. The step of generating, by the display apparatus, the encrypted first display light, may include: generating, by the display device, second display light; generating, by the first driving controller, a first driving signal according to the cipher; and generating a plurality of encryption areas according to the first driving signal, and converting the incident second display light into the first display light having different polarizing states in different encryption areas, by the encryption panel. The step of decrypting, by the decryption panel, the first display light according to a preset cipher, may include: generating, by the second driving controller, a second driving signal according to the cipher; and generating decryption areas corresponding to the encryption areas according to the second driving signal, and converting the incident first display light into the second display light in the decryption areas, by the decryption panel.

According to the embodiment of the present invention, the display system may further include a signal transmitter and a signal receiver. The encryption and decryption method may further include a step of: transmitting, by the signal transmitter, position signals of the encryption areas, after the step of generating, by the encryption panel, a plurality of encryption areas according to the first driving signal. The encryption and decryption method may further include a step of: receiving, by the signal receiver, the position signals to determine correspondence between the decryption areas and the encryption areas, before the step of generating, by the decryption panel, the decryption areas corresponding to the encryption areas according to the second driving signal.

According to the embodiment of the present invention, the encryption panel may include a first liquid crystal panel, the decryption panel may include a second liquid crystal panel, and arrangement directions of liquid crystals in the first liquid crystal panel and the second liquid crystal panel are perpendicular to each other.

According to the embodiment of the present invention, the first driving controller may include a first converting unit, a first generating unit and a first shift register unit, and the first generating unit is connected to the first converting unit and the first shift register unit, respectively. The second driving controller may include a second converting unit, a second generating unit and a second shift register unit, and the second generating unit is connected to the second converting unit and the second shift register unit, respectively. The step of generating, by the first driving controller, a first driving signal according to the cipher may include: converting, by the first converting unit, the cipher into a first binary code; generating, by the first generating unit, a first data signal and a first clock signal according to the first binary code; generating, by the first shift register unit, the first driving signal according to the first data signal and the first clock signal. The step of generating, by the second driving controller, a second driving signal according to the cipher may include: converting, by the second converting unit, the cipher into a second binary code; generating, by the second generating unit, a second data signal and a second clock signal according to the second binary code; and generating, by the second shift register unit, the second driving signal according to the second data signal and the second clock signal.

According to the embodiment of the present invention, the first driving controller may include a first storage unit and a first selecting unit, and the first storage unit is connected to the first selecting unit. The second driving controller may include a second storage unit and a second selecting unit, and the second storage unit is connected to the second selecting unit. The step of generating, by the first driving controller, a first driving signal according to the cipher may include: storing, by the first storage unit, the first driving signal correspondingly to the cipher; and retrieving, by the first selecting unit, the first driving signal corresponding to the cipher, according to the cipher. The step of generating, by the second driving controller, a second driving signal according to the cipher may include: storing, by the second storage unit, the second driving signal correspondingly to the cipher; and retrieving, by the second selecting unit, the second driving signal corresponding to the cipher, according to the cipher.

According to the display system and the encryption and decryption method thereof provided in the present invention, encryption could be realized based on the first driving signal generated according to the cipher, and decryption could be realized based on the second driving signal generated according to the cipher. Therefore, the displayed images could only be viewed with a decryption means, and thereby an encryption function of high level could be realized.

DETAILED DESCRIPTION OF THE EMBODIMENTS

To provide a better understanding of the technical solutions of the present invention for those skilled in the art, a display system and an encryption and decryption method thereof provided by the present invention will be described below in detail with reference to the accompanying drawings.

Figure 1:
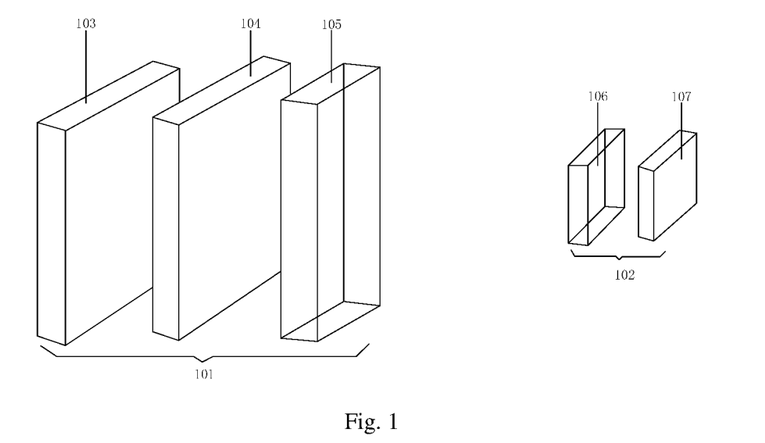
FIG. 1 is a schematic structure diagram illustrating a display system according to the embodiment of the present invention.

FIG. 1 is a schematic structure diagram illustrating a display system according to the embodiment of the present invention. As shown in FIG. 1, the display system according to the embodiment of the present invention includes a display apparatus 101 and a decryption apparatus 102. The display apparatus 101 includes a display device 103 and an encryption device provided on a light-exiting side of the display device 103. The encryption device includes an encryption panel 104 and a first driving controller 105. The decryption apparatus 102 include a decryption device, which includes a decryption panel 106 and a second driving controller 107.

In the present embodiment, the display apparatus 101 generates encrypted first display light, and the decryption panel 107 decrypts the first display light according to a preset cipher.

Figure 2:
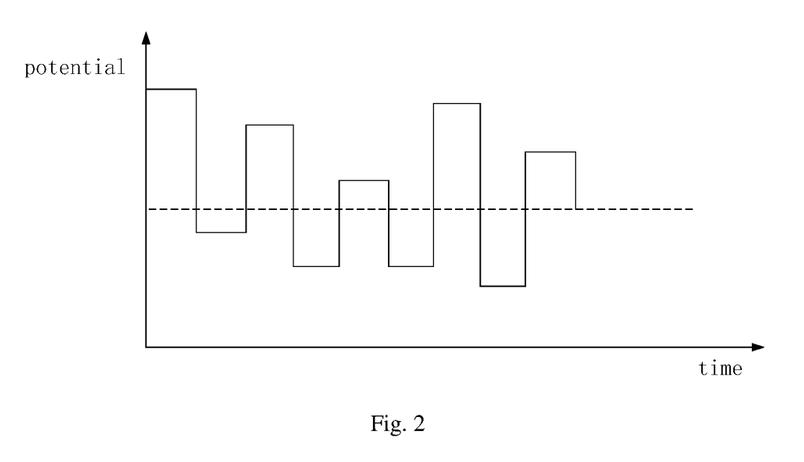
FIG. 2 is an exemplary waveform diagram of a first driving signal in the display system according to the embodiment of the present invention.
Figure 3A:
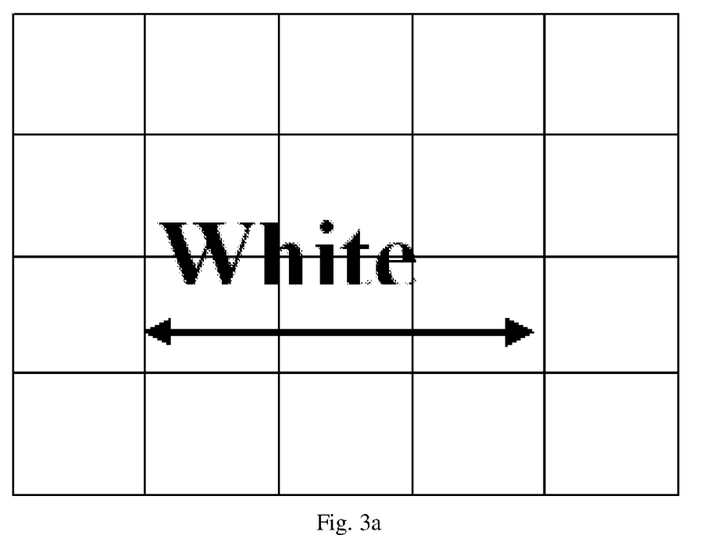
FIGS. 3a to 3c are schematic diagrams of encrypting the display system according to the embodiment of the present invention.
Figure 3B:
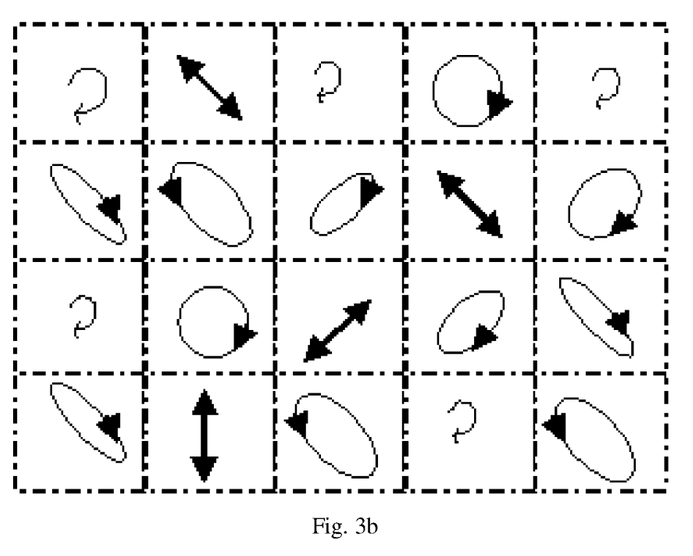
Figure 3C:
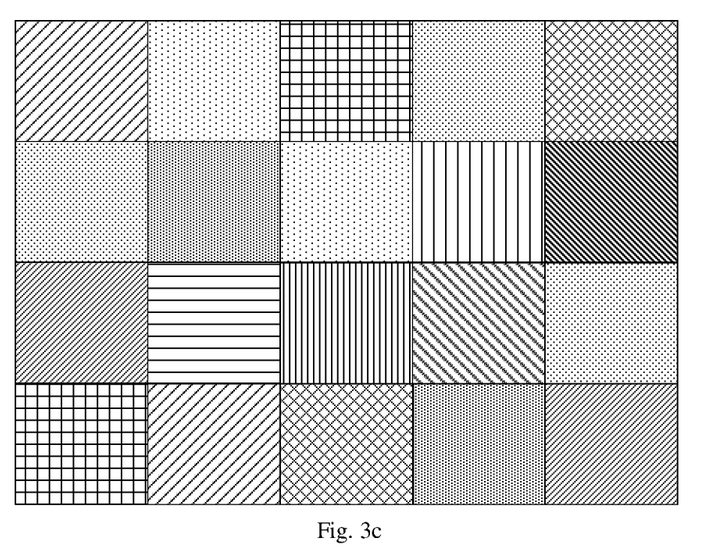

FIG. 2 is an exemplary waveform diagram of a first driving signal in the display system according to the embodiment of the present invention, and FIGS. 3a to 3c are schematic diagrams of encrypting the display system according to the embodiment of the present invention.

As shown in FIG. 2 and FIGS. 3a to 3c, the display device 103 generates second display light, and the first driving controller 105 generates the first driving signal (referring to FIG. 2) according to the cipher. It should be appreciated that the first driving signal shown in FIG. 2 is merely an exemplary waveform diagram, and is not intended to limit the first driving signal provided by the present invention. The encryption panel 104 generates a plurality of encryption areas according to the first driving signal generated by the first driving controller 105, and in different encryption areas, the incident second display light is converted into the first display light having different polarizing states. For example, the display device 103 generates the second display light (referring to FIG. 3a), the display image of which is "White", the first driving controller 105 generates the first driving signal (as shown in FIG. 2) according to the cipher, and the encryption panel 104 generates a plurality of encryption areas, each of which has a different phase-delay-function (referring to FIG. 3b), according to the first driving signal, thereby converting the incident second display light into the first display light having different polarizing states. At this time, only a distorted image (referring to FIG. 3c) like mosaic can be viewed by analyzing and observing the display apparatus with a polarizer.

Figure 4A:
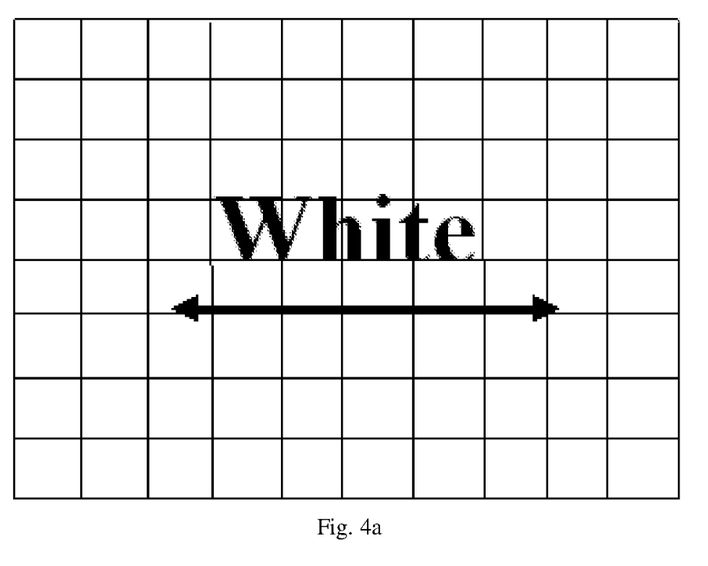
FIGS. 4a to 4c are schematic diagrams of decrypting the display system according to the embodiment of the present invention.
Figure 4B:
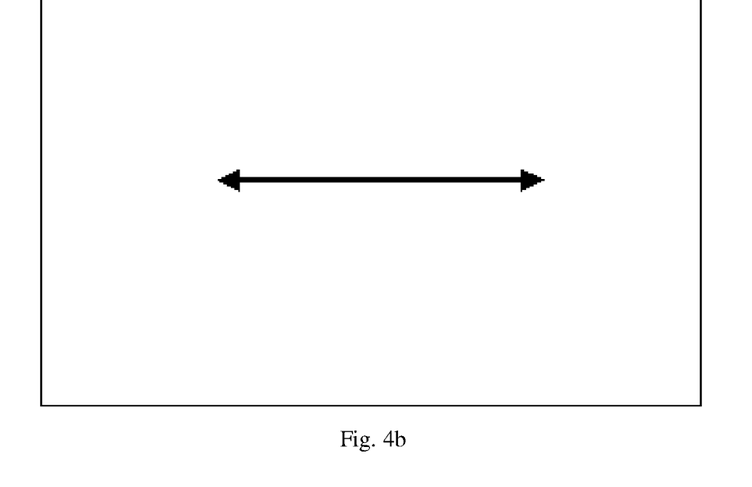
Figure 4C:
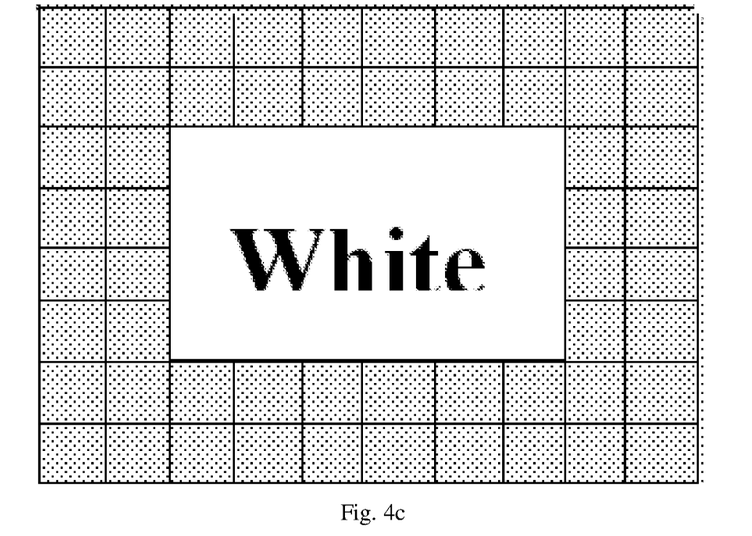

FIGS. 4a to 4c are schematic diagrams of decrypting the display system according to the embodiment of the present invention.

As shown in FIGS. 4a to 4c, the second driving controller 107 generates a second driving signal according to the cipher, and the decryption panel 106 generates decryption areas corresponding to the encryption areas according to the second driving signal generated by the second driving controller 107. That is to say, the decryption areas also have such phase-delay-function that the first display light is converted into the second display light having the display image of "White". The display image of "White" could be viewed by human eyes with a polarizer.

According to the display system of the present embodiment, encryption could be realized based on the first driving signal generated according to the cipher, and decryption could be realized based on the second driving signal generated according to the cipher. Therefore, the display image could only be viewed with a decryption means, and thereby an encryption function of high level could be realized.

According to the embodiment in this aspect, the display system may further include a signal transmitter and a signal receiver. The signal transmitter may be disposed on a light-exiting side of the encryption device, and the signal receiver may be disposed on a light-entering side of the decryption device. The signal transmitter transmits position signals of the encryption areas, and the signal receiver receives the position signals to determine correspondence between the decryption areas and the encryption areas. In this way, even the decryption apparatus 102 is in a moving state, the decryption areas on the decryption panel 106 of the decryption apparatus 102 can keep corresponding to and associated with the encryption areas on the encryption panel 104 of the display apparatus 101 all the time, so as to realize moving encryption and decryption.

Figure 5:
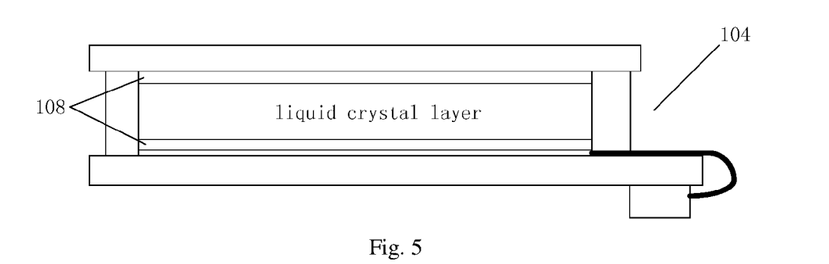
FIG. 5 is a schematic structure diagram illustrating an encryption panel in the display system according to the embodiment of the present invention.
Figure 6:
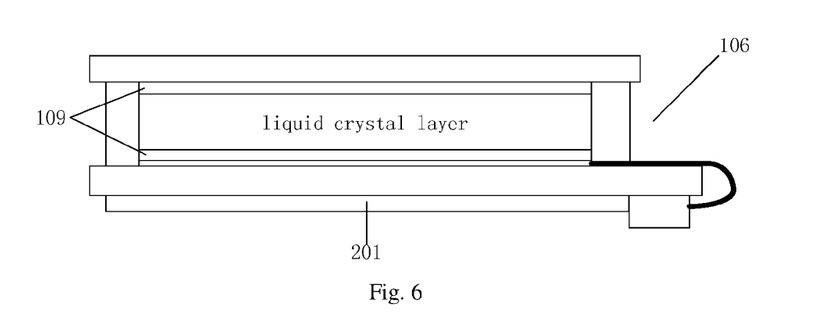
FIG. 6 is a schematic structure diagram illustrating a decryption panel in the display system according to the embodiment of the present invention.

FIG. 5 is a schematic structure diagram illustrating the encryption panel in the display system according to the embodiment of the present invention, and FIG. 6 is a schematic structure diagram illustrating the decryption panel in the display system according to the embodiment of the present invention;

As shown in FIG. 5 and FIG. 6, the encryption panel 104 includes a first liquid crystal panel, and the decryption panel 106 includes a second liquid crystal panel. A polarizer 201 is disposed on a light-exiting side of the second liquid crystal panel. The arrangement directions of liquid crystals in the first liquid crystal panel and the second liquid crystal panel are perpendicular to each other. By fixing an initial direction of liquid crystal molecules with an alignment layer made of polyimide, the arrangement directions of liquid crystals in the first liquid crystal panel and the second liquid crystal panel could be perpendicular to each other in an initial state. The first liquid crystal panel includes a first alignment layer 108, and the second liquid crystal panel includes a second alignment layer 109. The alignment direction of the first alignment layer 108 is perpendicular to that of the second alignment layer 109. In the case where other observers obtain the decryption apparatus and the cipher by accident, for example, since there is a one-to-one correspondence between the decryption apparatus and the encryption apparatus through the above processes, the observers, who obtain the decryption apparatus by accident, still cannot crack the display system provided according to the present invention as long as they do not know the display apparatus corresponding to the decryption apparatus, which makes the display system more secure.

According to the embodiment of the present invention, the first driving controller 105 may include a first converting unit, a first generating unit and a first shift register unit, and the first generating unit is connected to the first converting unit and the first shift register unit, respectively. The second driving controller 107 may include a second converting unit, a second generating unit and a second shift register unit, and the second generating unit is connected to the second converting unit and the second shift register unit, respectively. During the encrypting process, the first converting unit converts the cipher into a first binary code. The first generating unit generates a first data signal and a first clock signal according to the first binary code converted by the first converting unit. The first shift register unit generates the first driving signal according to the first data signal and the first clock signal. During the decrypting process, the second converting unit converts the cipher into a second binary code. The second generating unit generates a second data signal and a second clock signal according to the second binary code converted by the second converting unit. The second shift register unit generates the second driving signal according to the second data signal and the second clock signal.

According to another embodiment of the present invention, the first driving controller 105 may include a first storage unit and a first selecting unit, and the first storage unit is connected to the first selecting unit. The second driving controller 107 may include a second storage unit and a second selecting unit, and the second storage unit is connected to the second selecting unit. The first storage unit stores the first driving signal correspondingly to the cipher, and the first selecting unit retrieves the first driving signal corresponding to the cipher, according to the cipher. The second storage unit stores the second driving signal correspondingly to the cipher, and the second selecting unit retrieves the second driving signal corresponding to the cipher, according to the cipher.

Figure 7:
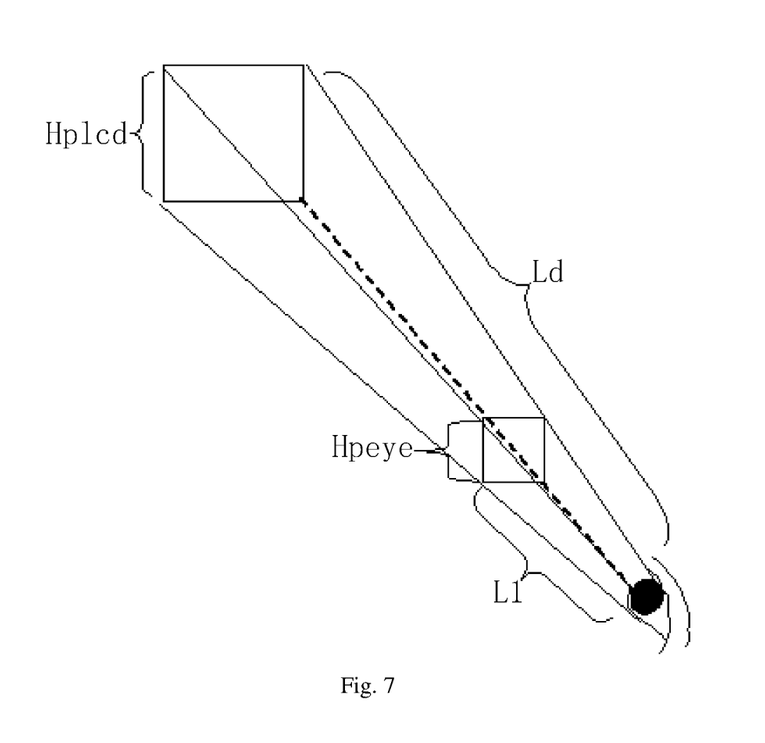
FIG. 7 is a schematic diagram showing positional relationship between a display apparatus and a decryption apparatus in the display system according to the embodiment of the present invention.

FIG. 7 is a schematic diagram showing positional relationship between the display apparatus and the decryption apparatus in the display system according to the embodiment of the present invention.

As shown in FIG. 7, the resolution of the encryption panel satisfies a condition of Hplcd<5 mm, and the resolution of the decryption panel satisfies a condition of Hpeye>0.02 mm. In order to realize a better viewing effect, there is certain requirement for the viewing distance. L1 denotes the distance between human eyes and the decryption panel, and Ld denotes the distance between human eyes and the encryption panel. L1, Ld, Hpeye, and Hplcd satisfy a basic relation of L1/Ld=Hpeye/Hplcd, and the minimum distance between human eyes and the decryption panel satisfies a condition of L1>150 mm. When the above conditions are satisfied, it can be derived that the optimum viewing distance Ld satisfies a condition of 300 mm<Ld<7500 mm.

Figure 8:
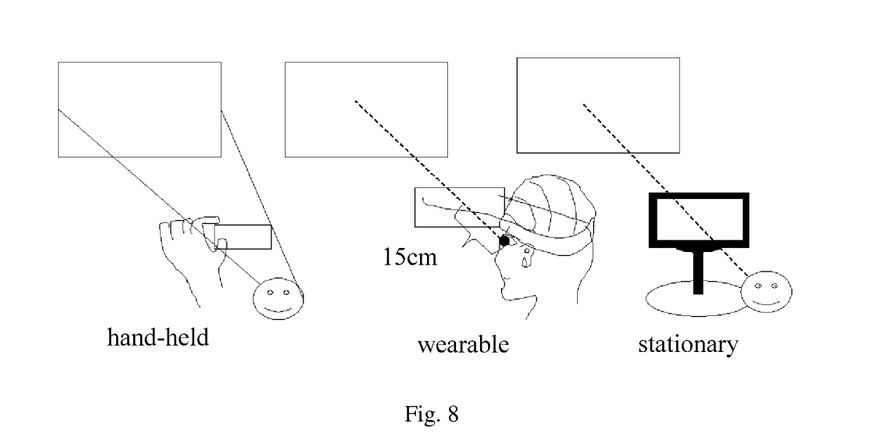
FIG. 8 is a schematic diagram showing a scenario to which the display system according to the embodiment of the present invention is applicable.

FIG. 8 is a schematic diagram showing a scenario to which the display system according to the embodiment of the present invention is applicable.

As shown in FIG. 8, the display system according to the embodiment of the present invention could be applied to different scenarios, for example, but not limited to, handheld applications, wearable applications, and stationary applications.

Figure 9:
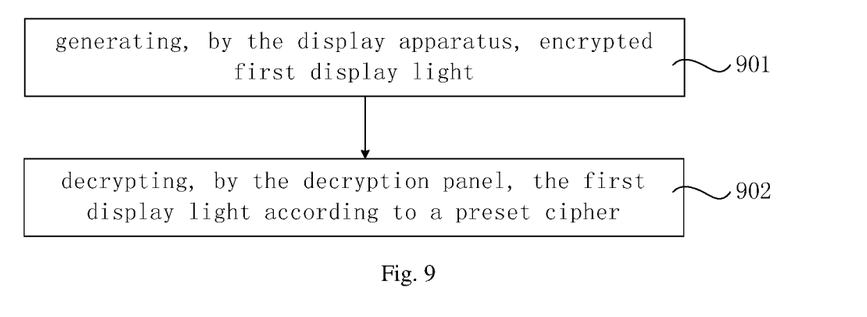
FIG. 9 is a flow chart showing an encryption and decryption method of the display system according to the embodiment of the present invention.

FIG. 9 is a flow chart showing an encryption and decryption method of the display system according to the embodiment of the present invention.

Referring to FIG. 9, the encryption and decryption method of the display system according to the embodiment of the present invention includes: generating, by the display apparatus, the encrypted first display light (901); and decrypting, by the decryption panel, the first display light according to a preset cipher (902).

Referring to FIGS. 1, 2, 3a to 3c and 9, the display apparatus 101 generates the encrypted first display light, and decryption panel 106 decrypts the first display light according to the preset cipher. In particular, the display device 103 generates the second display light, the first driving controller 105 generates the first driving signal according to the cipher, and the encryption panel 104 generates a plurality of encryption areas according to the first driving signal generated by the first driving controller 105, and converts the incident second display light into the first display light having different polarizing states in different encryption areas.

Referring to FIGS. 1, 4a to 4c and 9, FIG. 4a shows the decryption areas generated by the decryption panel 106. The second driving controller 107 generates the second driving signal according to the cipher, and the decryption panel 106 generates the decryption areas corresponding to the encryption areas according to the second driving signal generated by the second driving controller 107. That is to say, the decryption areas also have such phase-delay-function that the first display light is converted into the second display light having the display image of "White". FIG. 4b shows the polarizer on a human-eye side, and FIG. 4c shows a reverted image that is viewed with the polarizer. The display image of "White" could be viewed by human eyes with the polarizer.

It could be understood that the above embodiments are exemplary embodiments which are used to describe the principle of the present invention only, and the present invention is not limited thereto. Accordingly, it will be understood by those ordinarily skilled in the art that various improvements and modifications may be made without departing from the spirit and substance of the present invention, and these improvements and modifications are also considered as falling into the protection scope of the present invention.

The invention claimed is:

1. A display system, comprising:
a display apparatus and a decryption apparatus, wherein the decryption apparatus includes a decryption device, the decryption device includes a decryption panel;
the display apparatus generates encrypted first display light;
the decryption panel decrypts the first display light according to a preset cipher,
wherein the display apparatus includes a display device and an encryption device, the encryption device includes an encryption panel and a first driving controller, the decryption device further includes a second driving controller;
the display device generates second display light;
the first driving controller generates a first driving signal according to the cipher;
the encryption panel generates a plurality of encryption areas according to the first driving signal, and converts the incident second display light into the first display light having different polarizing states in different encryption areas;
the second driving controller generates a second driving signal according to the cipher; and
the decryption panel generates decryption areas corresponding to the encryption areas according to the second driving signal, and converts the incident first display light into the second display light in the decryption areas.

2. The display system according to claim 1, further including a signal transmitter and a signal receiver;
the signal transmitter transmits position signals of the encryption areas; and
the signal receiver receives the position signals to determine correspondence between the decryption areas and the encryption areas.

3. The display system according to claim 1, wherein the encryption panel includes a first liquid crystal panel, the decryption panel includes a second liquid crystal panel, and arrangement directions of liquid crystals in the first liquid crystal panel and the second liquid crystal panel are perpendicular to each other.

4. The display system according to claim 1, wherein the first driving controller includes a first converting unit, a first generating unit and a first shift register unit, and the first generating unit is connected to the first converting unit and the first shift register unit, respectively; the second driving controller includes a second converting unit, a second generating unit and a second shift register unit, and the second generating unit is connected to the second converting unit and the second shift register unit, respectively;
the first converting unit converts the cipher into a first binary code;
the first generating unit generates a first data signal and a first clock signal according to the first binary code;
the first shift register unit generates the first driving signal according to the first data signal and the first clock signal;
the second converting unit converts the cipher into a second binary code;

the second generating unit generates a second data signal and a second clock signal according to the second binary code; and the second shift register unit generates the second driving signal according to the second data signal and the second clock signal.

5. The display system according to claim 1, wherein the first driving controller includes a first storage unit and a first selecting unit, and the first storage unit is connected to the first selecting unit; the second driving controller includes a second storage unit and a second selecting unit, and the second storage unit is connected to the second selecting unit;

the first storage unit stores the first driving signal correspondingly to the cipher;

the first selecting unit retrieves the first driving signal corresponding to the cipher, according to the cipher;

the second storage unit stores the second driving signal correspondingly to the cipher; and the second selecting unit retrieves the second driving signal corresponding to the cipher, according to the cipher.

6. An encryption and decryption method of a display system, wherein the display system includes a display apparatus and a decryption apparatus, the decryption apparatus includes a decryption device, the decryption device includes a decryption panel, and the encryption and decryption method comprises steps of:

generating, by the display apparatus, encrypted first display light; and decrypting, by the decryption panel, the first display light according to a preset cipher, wherein the display apparatus includes a display device and an encryption device, the encryption device includes an encryption panel and a first driving controller, the decryption device further includes a second driving controller, wherein the step of generating, by the display apparatus, encrypted first display light includes:

generating, by the display device, second display light;

generating, by the first driving controller, a first driving signal according to the cipher; and generating a plurality of encryption areas according to the first driving signal, and converting the incident second display light into the first display light having different polarizing states in different encryption areas, by the encryption panel; and wherein, the step of decrypting, by the decryption panel, the first display light according to a preset cipher includes:

generating, by the second driving controller, a second driving signal according to the cipher; and generating decryption areas corresponding to the encryption areas according to the second driving signal, and converting the incident first display light into the second display light in the decryption areas, by the decryption panel.

7. The encryption and decryption method of a display system according to claim 6, wherein the display system further includes a signal transmitter and a signal receiver;

wherein the encryption and decryption method further includes a step of: transmitting, by the signal transmitter, position signals of the encryption areas, after the step of generating, by the encryption panel, a plurality of encryption areas according to the first driving signal; and wherein the encryption and decryption method further includes a step of: receiving, by the signal receiver, the position signals to determine correspondence between the decryption areas and the encryption areas, before the step of generating, by the decryption panel, decryption areas corresponding to the encryption areas according to the second driving signal.

8. The encryption and decryption method of a display system according to claim 6, wherein the encryption panel includes a first liquid crystal panel, the decryption panel includes a second liquid crystal panel, and arrangement directions of liquid crystals in the first liquid crystal panel and the second liquid crystal panel are perpendicular to each other.

9. The encryption and decryption method of a display system according to claim 6, wherein the first driving controller includes a first converting unit, a first generating unit and a first shift register unit, and the first generating unit is connected to the first converting unit and the first shift register unit, respectively; the second driving controller includes a second converting unit, a second generating unit and a second shift register unit, and the second generating unit is connected to the second converting unit and the second shift register unit, respectively;

wherein the step of generating, by the first driving controller, a first driving signal according to the cipher includes:

converting, by the first converting unit, the cipher into a first binary code;

generating, by the first generating unit, a first data signal and a first clock signal according to the first binary code; and generating, by the first shift register unit, the first driving signal according to the first data signal and the first clock signal; and wherein the step of generating, by the second driving controller, a second driving signal according to the cipher includes:

converting, by the second converting unit, the cipher into a second binary code;

generating, by the second generating unit, a second data signal and a second clock signal according to the second binary code; and generating, by the second shift register unit, the second driving signal according to the second data signal and the second clock signal.

10. The encryption and decryption method of a display system according to claim 6, wherein the first driving controller includes a first storage unit and a first selecting unit, and the first storage unit is connected to the first selecting unit; the second driving controller includes a second storage unit and a second selecting unit, and the second storage unit is connected to the second selecting unit;

wherein the step of generating, by the first driving controller, a first driving signal according to the cipher includes:

storing, by the first storage unit, the first driving signal correspondingly to the cipher; and retrieving, by the first selecting unit, the first driving signal corresponding to the cipher, according to the cipher; and wherein the step of generating, by the second driving controller, a second driving signal according to the cipher includes:

storing, by the second storage unit, the second driving signal correspondingly to the cipher; and retrieving, by the second selecting unit, the second driving signal corresponding to the cipher, according to the cipher.

\* \* \* \* \*